United States Patent

Matsushita et al.

[11] Patent Number: 5,181,497
[45] Date of Patent: Jan. 26, 1993

[54] EVAPO-CONTROL VALVE

[75] Inventors: Yoshiharu Matsushita; Kazumasa Komura, both of Ibaraki, Japan

[73] Assignee: Kyosan Denki Kabushiki Kaisha, Tokyo, Japan

[21] Appl. No.: 838,350

[22] Filed: Feb. 19, 1992

[51] Int. Cl.$^5$ .................. F02M 33/02; F16K 24/00
[52] U.S. Cl. .................. 123/520; 137/587; 137/43
[58] Field of Search ............... 123/516, 518, 519, 520, 123/521; 137/43, 587, 614.2, 512, 493

[56] References Cited

U.S. PATENT DOCUMENTS

| 4,044,743 | 8/1977 | Eaton | 123/520 |
|---|---|---|---|
| 4,137,943 | 2/1979 | Rath | 137/587 |
| 4,434,810 | 3/1984 | Atkinson | 137/493 |
| 4,456,216 | 6/1984 | Boruta | 123/516 |
| 4,597,767 | 7/1986 | Lenkei | 137/512 |
| 4,729,401 | 3/1988 | Raines | 137/512 |
| 4,742,840 | 5/1988 | Takahashi et al. | 137/43 |
| 4,760,858 | 8/1988 | Szlaga | 137/43 |
| 4,779,637 | 10/1988 | Ubaldi | 137/43 |
| 4,796,593 | 1/1989 | Woodcock et al. | 123/516 |
| 4,807,656 | 2/1989 | Ito | 137/43 |
| 4,869,283 | 9/1989 | Oeffling et al. | 137/43 |
| 4,905,726 | 3/1990 | Kasugai et al. | 137/43 |
| 4,917,145 | 4/1990 | Wawra et al. | 137/493 |
| 4,922,954 | 5/1990 | Blomquist et al. | 137/493 |
| 4,986,246 | 1/1991 | Kessler de Vivie et al. | 123/520 |
| 5,054,508 | 10/1991 | Benjey | 137/43 |
| 5,054,528 | 10/1991 | Saitoh | 137/587 |

Primary Examiner—E. Rollins Cross
Assistant Examiner—Thomas N. Moulis
Attorney, Agent, or Firm—Flynn, Thiel, Boutell & Tanis

[57] ABSTRACT

An evapo-control valve, which is disposed in a pipe for connecting a fuel tank and a canister, comprises a fuel tank side connecting port which communicates with the fuel tank, a canister side connecting port which communicates with the canister, an intake manifold side connecting port which communicates with an intake manifold, a closing valve for permitting the canister side connecting port to communicate with the fuel tank side connecting port by the negative pressure in the intake manifold side connecting port during the operation of an engine, and a check valve for permitting the atmosphere in the canister to communicate with the fuel tank when the fuel tank is negatively pressurized due to cold weather during the stop of the engine.

17 Claims, 5 Drawing Sheets

EVAPO-CONTROL VALVE

BACKGROUND OF THE INVENTION

1. Field of the Invention

The present invention relates to an evapo-control valve to be used in a combustion engine of a land vehicle.

2. Prior Art

An evaporated gas (hereinafter referred to as an evapo-gas) in a fuel tank is discharged to an atmosphere by providing an evaporated control valve (hereinafter referred to as an evapo-control valve) in a pipe which connects a fuel tank to a canister.

That is, the evapo-gas in the fuel tank is supplied to the canister by opening and closing the evapo-control valve provided in the pipe depending on the pressure in the fuel tank.

Figure 9:
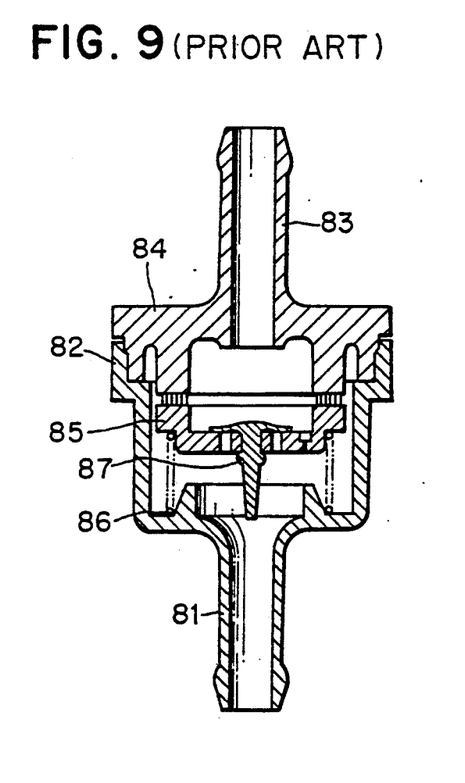
FIG. 9 is a cross-sectional view of a conventional evapo-control valve.

FIG. 9 shows a conventional evapo-control valve comprising a casing 82 having a canister side connecting port 81 and a collar 84 having a fuel tank side connecting port 83, wherein the casing 82 and the collar 84 form a space therein. In the space, there are provided a closing valve 85 which is openable from the fuel tank side to the canister side, a spring 86 which presses the closing valve 85 against the collar 84 and a check valve having a shell type valve 87 which is provided in the central portion of the closing valve 85 and openable from the canister side toward the fuel tank side.

According to the conventional evapo-control valve, when the pressure inside the fuel tank rises to a reference value due to generation of the evapo-gas, the gas pressure exceeds the resilience of the spring 86 to thereby open the closing valve 85 so that the evapo-gas in the fuel tank is supplied to the canister. As a result, it was possible to prevent a pressure in the fuel tank from rising and to let the evapo-gas for going off into the canister.

When the pressure in the fuel tank is reduced due to consumption of the fuel and the cold weather, the shell type valve 87 is open so that the atmosphere is introduced from the canister into the fuel tank. As a result, the pressure in the fuel tank equals to the atmospheric pressure thereby preventing the fuel tank from deforming.

Since the closing valve 85 is not open until the pressure in the fuel tank rises to a prescribed value according to the conventional evapo-control valve, the evapo-gas is not supplied to the canister until it rises to the prescribed value so that the evapo-gas, which remains in the fuel tank, is discharged to the atmosphere when the filler cap is open.

When the spring 86 having less resilience is employed to close the closing valve 85, there was a problem in that the liquid fuel is apt to be introduced into the canister because the liquid fuel opens the closing valve 85 when the liquid fuel is supplied to the fuel tank.

SUMMARY OF THE INVENTION

The present invention has been made in view of the problems of the conventional evapo-control valve and is to provide an evapo-control valve which can smoothly regulate the pressure in the fuel tank without discharging the evapo-gas into the atmosphere.

Furthermore, the present invention is also to provide an evapo-control valve additionally provided with a device for preventing the fuel from leaking toward the canister side when the land vehicle is inclined or falls down.

To achieve the above object, the evapo-control valve which is disposed in the pipe for connecting a fuel tank and a canister according to the present invention comprises connecting ports which communicate with the fuel tank side, the canister side and an intake manifold side, a closing valve for permitting the canister side connecting port to communicate with the fuel tank side connecting port due to generation of the negative pressure generated in the intake manifold side connecting port when the engine operates, and a check valve for permitting the atmosphere in the canister to communicate with the fuel tank when the fuel tank is negatively pressurized due to cold weather during the stop of engine.

Furthermore, the evapo-control valve is provided with ball valves to prevent the fuel from leaking toward the canister when the land vehicle is inclined or falls down.

DESCRIPTION OF THE PREFERRED EMBODIMENT

Figure 1:
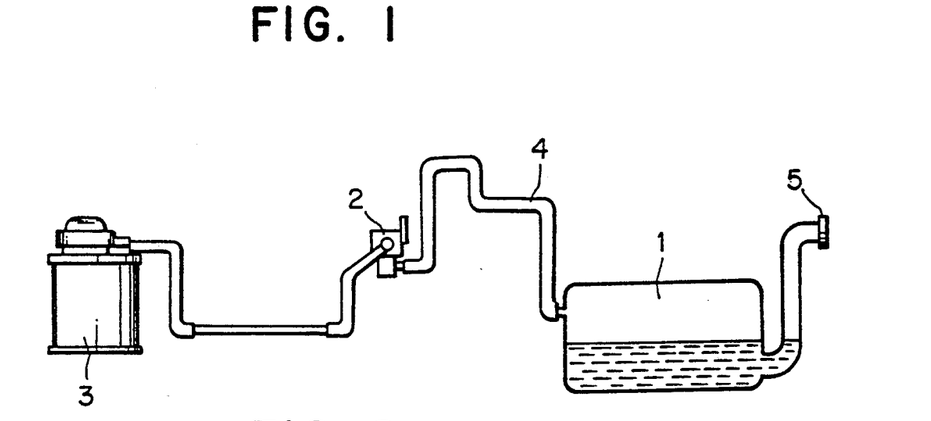
FIG. 1 is a schematic view of an evapo-control device employing an evapo-control valve according to a first embodiment of the present invention.
Figure 2:
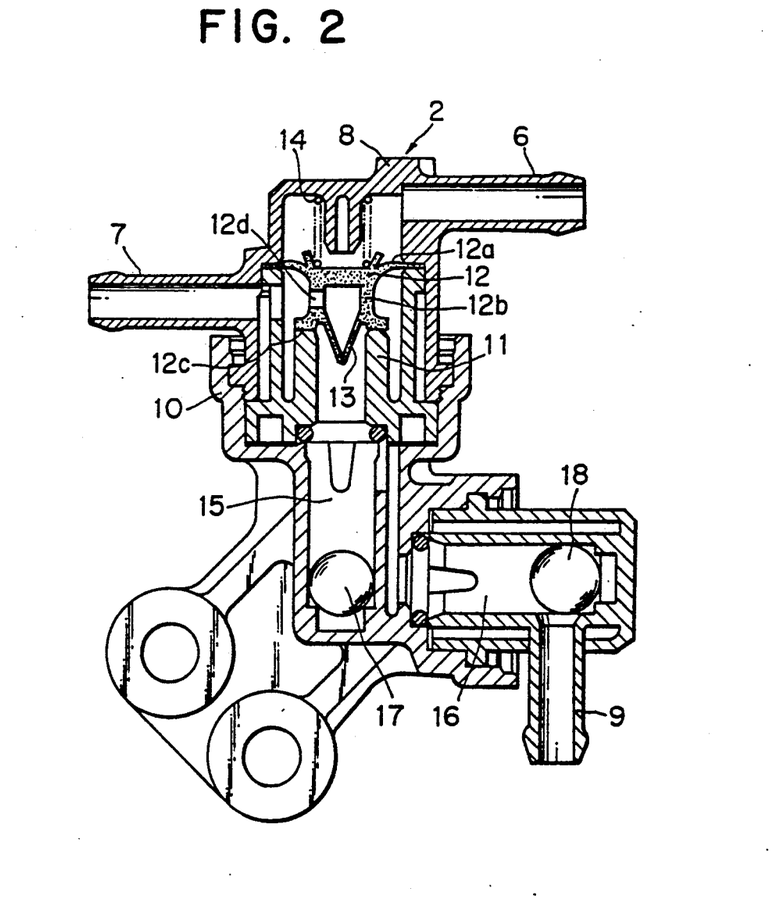
FIG. 2 is a cross-sectional view of the evapo-control valve according to the first embodiment.

First Embodiment (FIGS. 1 and 2):

An evapo-control valve according to a first embodiment of the present invention will be described with reference to FIGS. 1 and 2.

Denoted at 1 is a fuel tank, 2 is an evapo-control valve, 3 is a canister, 4 is a pipe and 5 is a filler cap for opening and closing a fuel introduction pipe.

The evapo-control valve 2 comprises a canister side casing 8, which has an intake manifold side connecting port 6 for receiving a negative pressure from an intake manifold, not shown, and a canister side connecting port 7 communicating with the canister 3, a fuel tank side casing 10, which has a fuel tank side connecting port 9 communicating with the fuel tank side 1, and a valve seat 11 disposed between the casings 8 and 10.

A diaphragm 12a is stretched between the connecting ports 6 and 7, which separates the intake manifold side connecting port 6 from the canister side connecting port 7. The diaphragm 12a forms a diaphragm type closing valve as a whole and comprises a cylinder portion 12b at the lower portion thereof and a valve 12c at the lower end of the cylinder portion 12b so as to contact the valve seat 11.

A slit type check valve 13 is integrally formed with the diaphragm type closing valve 12 inside the valve 12c. A passage 12d is perforated at the outer periphery of the cylinder portion 12b for permitting the canister 3 to communicate with the slit type check valve 13.

A spring 14 is stretched between the casing 8 and the diaphragm 12a so as to urge the diaphragm type closing valve 12 against the valve seat 11.

Balls 17 and 18, which are disposed in a passage 15 of the casing 10 and a passage 16 communicating with the fuel tank side connecting port 9, prevent the fuel from leaking by closing the passages 15 and 16 when the land vehicle is inclined or falls down.

When the fuel is supplied in the fuel tank 1 by opening the filler cap 5, the fuel is prevented from being introduced into the canister since the passage 15 in the evapo-control valve 2 is closed by the valve 12c and the valve seat 11 even if the liquid fuel flows from the fuel tank 1 toward the evapo-control valve 2 through the pipe 4. The evapo-gas is prevented from discharging to the atmosphere when the filler cap 5 is open since no evapo-gas is supposed to remain in the fuel tank 1 because the fuel is usually supplied to the fuel tank immediately after the engine stops.

When the pressure in the fuel tank 1 exceeds the predetermined valve due to the increase of the pressure of the evapo-gas during the stop of the engine, the pressure in the fuel tank exceeds the resilience of the spring 14 to thereby open the valve 12c so that the evapo-gas in the fuel tank 1 is discharged toward the canister 3.

Even if the evapo-gas is generated in the fuel tank 1 when the engine operates, the evapo-gas is introduced into the canister side connecting port 7 from the fuel tank side connecting port 9 and thereafter discharged to the canister 3, which prevents the evapo-gas from remaining in the fuel tank 1 since the negative pressure in the intake manifold influences the diaphragm 12a by way of the intake manifold side connecting port 6, to thereby draw the diaphragm upward so that the diaphragm 12 is always open.

When the fuel tank 1 is negatively pressurized due to the cold weather during the stop of the engine, the slit valve 13 is open so that the atmosphere is introduced from the canister 3 to the fuel tank 1. When the land vehicle is inclined or falls down, the passages from the fuel tank side to the canister side, namely, passages 16 and 15 extending from the connecting port 9 to the connecting port 7, are closed by the ball valves 17, 18 so that the fuel is prevented from leaking.

Figure 3:
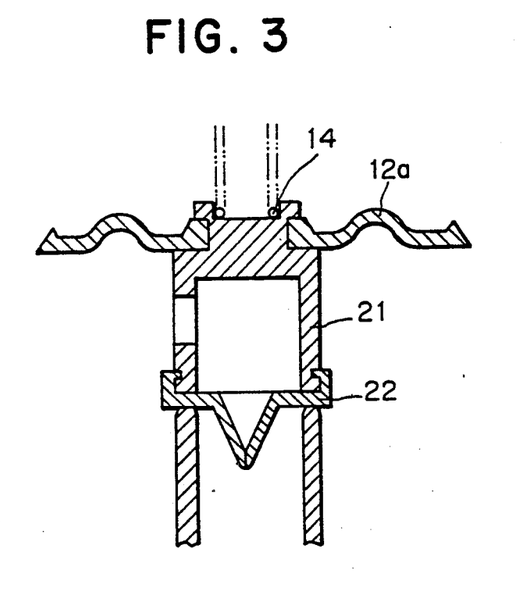
FIG. 3 is a cross-sectional view of a main portion of the evapo-control valve, which is a modification of the evapo-control valve in FIG. 2, according to a second embodiment of the present invention.

Second Embodiment (FIG. 3):

An evapo-control valve according to a second embodiment will be described with reference to FIG. 3. The evapo-control valve according to the second embodiment is a modification of the evapo-control valve of the first embodiment in which a diaphragm type closing valve 21 is formed separately from a slit type check valve 22 although the diaphragm type closing valve 12 and the slit type check valve 13 are integrally formed in the first embodiment. Accordingly, the components other than the diaphragm type closing valve 21 and the slit type check valve 22 are same as those of the first embodiment and the operation of the evapo-control valve according to the second embodiment is same as that of the first embodiment.

Figure 4:
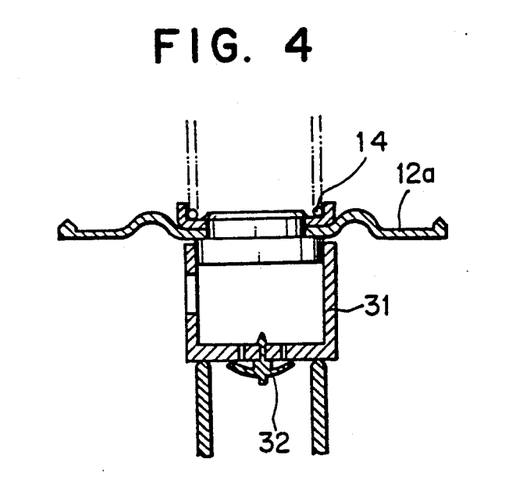
FIG. 4 is a cross-sectional view of the evapo-control valve, which is another modification of the evapo-control valve in FIG. 2, according to a third embodiment of the present invention.

Third Embodiment (FIG. 4):

An evapo-control valve according to a third embodiment will be described with reference to FIG. 4. The evapo-control valve according to the third embodiment is another modification of the evapo-control valve of the first embodiment in which a diaphragm type closing valve 31 is formed separately from a shell type check valve 32 and thereafter is integrated with the latter although the diaphragm type closing valve 12 and the slit type check valve 13 are integrally formed in the first embodiment. Accordingly, the components other than the diaphragm type closing valve 31 and the shell type check valve 32 are same as those of the first embodiment and the operation of the evapo-control valve according to the second embodiment is same as that of the first embodiment.

Figure 5:
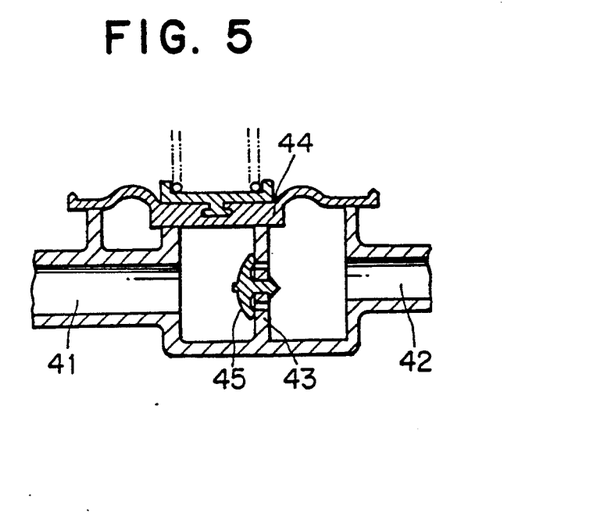
FIG. 5 is a cross-sectional view of a main portion of an evapo-control valve according to a fourth embodiment of the present invention.

Fourth Embodiment (FIG. 5):

An evapo-control valve according to a fourth embodiment will be described with reference to FIG. 5. The evapo-control valve according to the fourth embodiment is a modification of the evapo-control valve of the third embodiment in which a relative position between a closing valve and a check valve is different from that of the third embodiment. That is, the evapo-control valve according to the fourth embodiment comprises a partitioning wall 43, which is provided between a fuel tank side connecting port 41 and a canister side connecting port 42, a diaphragm type closing valve 44, which is disposed over the upper surface open portion of the partitioning wall 43 and a shell type check valve 45, which is provided on the partitioning wall 43. The operation of the evapo-control valve according to the fourth embodiment is substantially the same as that of the third embodiment.

Figure 6:
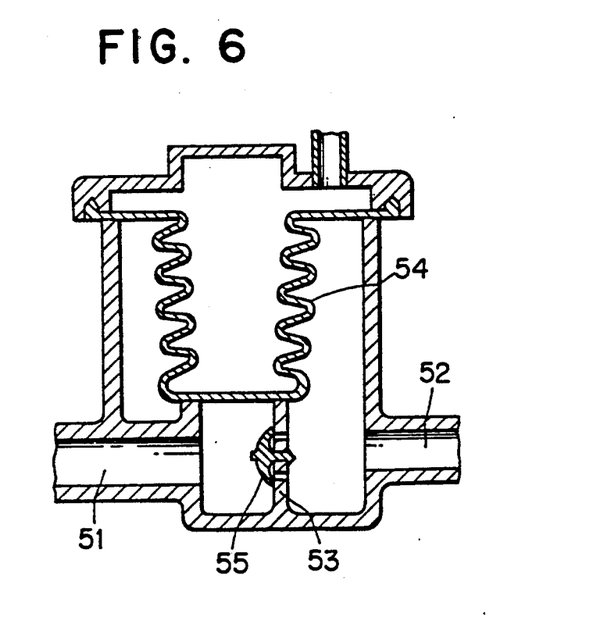
FIG. 6 is a cross-sectional view of a main portion of an evapo-control valve according to a fifth embodiment of the present invention.

Fifth Embodiment (FIG. 6):

An evapo-control valve according to a fifth embodiment will be described with reference to FIG. 6. The evapo-control valve according to the fifth embodiment is a modification of the evapo-control valve of the fourth embodiment in which the diaphragm type closing valve is replaced by a bellow type closing valve 54. That is, the evapo-control valve according to the fifth embodiment comprises a partitioning wall 53, which is provided between the fuel tank side port 51 and the canister side port 52, the bellow type valve 54, which is disposed over the upper surface open portion of the partitioning wall 53 and a shell type check valve 55, which is provided on the partitioning wall 53. The operation of the evapo-control valve according to the fourth embodiment is substantially the same as that of the fourth embodiment.

Figure 7:
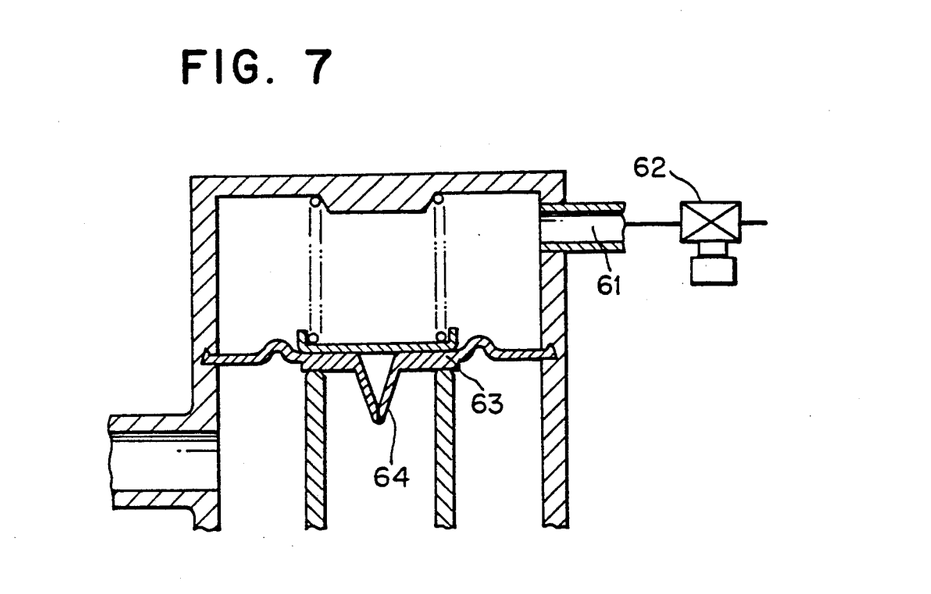
FIG. 7 is a cross-sectional view of a main portion of an evapo-control valve according to a sixth embodiment of the present invention.

Sixth Embodiment (FIG. 7):

An evapo-control valve according to a sixth embodiment will be described with reference to FIG. 7.

The evapo-control valve according to the sixth embodiment is different from that of the first embodiment in respect of a means to supply the atmosphere when the fuel tank is negatively pressurized due to the cold weather, etc.

The evapo-control valve according to the six embodiment comprises a solenoid valve 62, which is interposed between an intake manifold, not shown, and an intake manifold side connecting port 61 for receiving the negative pressure and a diaphragm type closing valve 63, in which the solenoid valve 62 is turned on when the engine operates to thereby permit the negative pressure in the intake manifold to be applied to the intake manifold side connecting port 61 so as to open the diaphragm type valve 63 so that the evapo-control valve operates in the same manner as that of the first embodiment. When the engine stops, the solenoid valve 62 is turned off, to thereby open the same to the atmosphere while the diaphragm type closing valve 63 is open. At this time, when the fuel tank is negatively pressurized due to the cold weather, etc, a slit type check valve 64 is open so that the atmosphere is introduced into the fuel tank 1 by way of the solenoid valve 62, the intake manifold side connecting port 61 and the slit type check valve 64. The slit type check valve may be replaced by a shell type valve.

Figure 8:
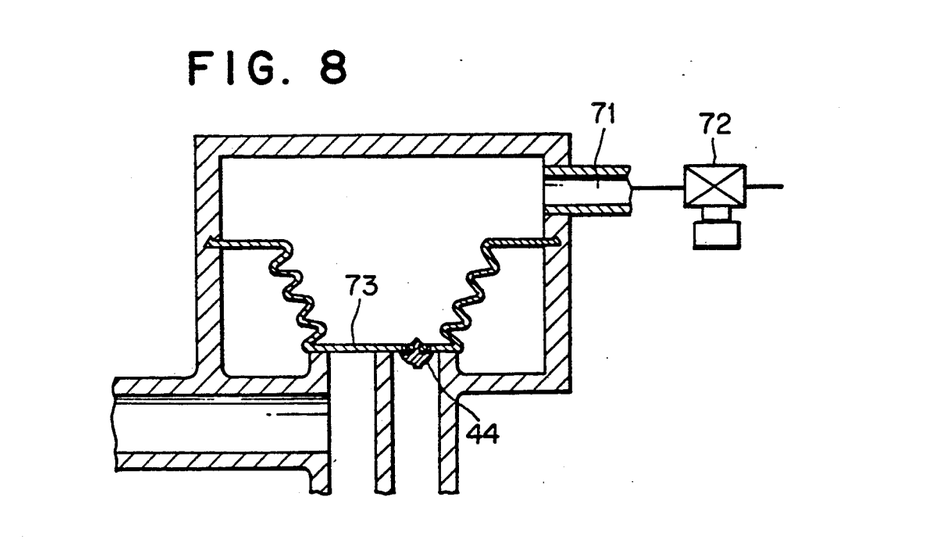
FIG. 8 is a cross-sectional view of a main portion of an evapo-control valve according to a seventh embodiment of the present invention.

Seventh Embodiment (FIG. 8):

An evapo-control valve according to a seventh embodiment will be described with reference to FIG. 8.

The evapo-control valve according to the seventh embodiment is a modification of the evapo-control valve of the sixth embodiment excepting that the diaphragm type closing valve of the sixth embodiment is replaced by a bellow type closing valve. That is, a solenoid valve 72 is provided between an intake manifold and an intake manifold side connecting port 71 for receiving the negative pressure. The solenoid valve 72 is turned on when the engine operates to thereby permit the negative pressure in the intake manifold to be applied to the intake manifold side connecting port 71, to thereby open a bellow type closing valve 73, so that the evapo-control valve operates in the same manner as the sixth embodiment. When the engine stops, the solenoid valve 72 is turned off to thereby open the same to the atmosphere while the bellow type closing valve 73 is open. At this time, when the fuel tank is negatively pressurized, a shell type check valve 74 is open and the atmosphere is introduced into the fuel tank 1 by way of the solenoid valve 72, the connecting port 71 and the shell type check valve 74. The shell type check valve 74 may be replaced by a slit type check valve.

With the arrangement of the evapo-control valve according to the present invention, the closing valve is open by the negative pressure which is generated when the engine operates so that the evapo-gas in the fuel tank is always supplied to the canister. As a result, no evapo-gas remains in the fuel tank and the fuel tank is prevented from deforming due to positive pressure and the evapo-gas is prevented from discharging to the atmosphere.

When the fuel tank is negatively pressurized due to the cold weather, etc. during the stop of the engine, the check valve is open so that the atmosphere is supplied from the canister or the intake manifold to the fuel tank. Accordingly, the fuel tank is prevented from deforming.

Furthermore, if the evapo-gas is generated during the stop of the engine and reaches the prescribed pressure, the closing valve is open so that the evapo-gas can be supplied to the canister.

Even if the liquid fuel is introduced into the fuel tank to the evapo-control valve through the pipe when the fuel is supplied in the fuel tank, the liquid fuel is passage in the evapo-control valve is closed by the closing valve.

Still furthermore, if the land vehicle is inclined or falls dawn, the passages in the evapo-gas control valve which communicate from the fuel tank to the canister are closed by the balls, the fuel is prevented from leaking.

What is claimed is:

1. An evapo-control valve, which is disposed in a pipe for connecting a fuel tank and a canister, comprising:
    a fuel tank side connecting port which communicates with the fuel tank;
    a canister side connecting port which communicates with the canister;
    an intake manifold side connecting port which communicates with an intake manifold;
    a closing valve for permitting the canister side connecting port to communicate with the fuel tank side connecting port by a negative pressure in the intake manifold side connecting port during the operation of an engine; and
    a check valve for permitting the atmosphere in the canister to communicate with the fuel tank when the fuel tank is negatively pressurized due to cold weather during the stop of the engine.

2. An evapo-control valve according to claim 1, wherein ball valves are provided in passages which are disposed between the tank side connecting port and the valve seat of the closing valve for closing the passages when a land vehicle is inclined or falls down.

3. An evapo-control valve, which is disposed in a pipe for connecting a fuel tank and a canister, comprising:
    a fuel tank side connecting port which communicates with the fuel tank;
    a canister side connecting port which communicates with the canister;
    an intake manifold side connecting port which communicates with an intake manifold;
    a closing valve for permitting the canister side connecting port to communicate with the fuel tank side connecting port by a negative pressure in the intake manifold side connecting port during the operation of an engine; and
    a check valve for permitting the atmosphere in the intake manifold to communicate with the fuel tank when the fuel tank is negatively pressurized due to cold weather during the stop of the engine.

4. An evapo-control valve according to claim 3, wherein ball valves are provided in passages which are disposed between the tank side connecting port and the valve seat of the closing valve for closing the passages when a land vehicle is inclined or falls down.

5. An evapo-control valve, which is disposed in a pipe for connecting a fuel tank and a canister, comprising:
    a fuel tank side connecting port which communicates with the fuel tank;
    a canister side connecting port which communicates with the canister;
    an intake manifold side connecting port which communicates with an intake manifold;
    a diaphragm closing valve, which is composed of a diaphragm disposed between the intake manifold side connecting port and the canister side connecting port, and a valve seat disposed between the fuel tank side connecting port and the canister side connecting port; and
    a check valve which is integrated with the diaphragm type closing valve, disposed inside the valve seat between the canister side connecting port and the fuel tank side connecting port, and is directed from the canister side connecting port to the fuel tank connecting port.

6. An evapo-control valve according to claim 5, wherein the diaphragm type closing valve is manufactured separately from but integrated with the slit type check valve.

7. An evapo-control valve according to claim 5, wherein the check valve is a shell type check valve, which is manufactured separately from but integrated with the diaphragm type closing valve.

8. An evapo-control valve, which is disposed in a pipe for connecting a fuel tank and a canister, comprising:
- a fuel tank side connecting port which communicates with the fuel tank;
- a canister side connecting port which communicates with the canister;
- an intake manifold side connecting port which communicates with an intake manifold;
- a partitioning wall which is disposed between the fuel tank side connecting port and the canister side connecting port;
- a closing valve which is disposed over an upper surface open portion of the partitioning wall; and
- a shell type check valve which is provided on the partitioning wall.

9. An evapo-control valve according to claim 8, wherein the diaphragm type closing valve is a bellow type closing valve.

10. An evapo-control valve, which is disposed in a pipe for connecting a fuel tank and a canister, comprising:
- a fuel tank side connecting port which communicates with the fuel tank;
- a canister side connecting port which communicates with the canister;
- an intake manifold side connecting port which communicates with an intake manifold;
- a diaphragm closing valve, which is composed of a diaphragm disposed between the intake manifold side connecting port and the canister side connecting port, and a valve seat disposed between the fuel tank side connecting port and the canister side connecting port;
- a check valve which is integrated with the diaphragm type closing valve, disposed inside the valve seat between the canister side connecting port and the fuel tank side connecting port, and is directed from the canister side connecting port to the fuel tank connecting port; and
- a solenoid valve which is disposed between the intake manifold side connecting port for permitting the intake manifold to communicate with the intake manifold connecting port during the operation of the engine while permitting the solenoid valve to be open to the atmosphere.

11. An evapo-control valve, which is disposed in a pipe for connecting a fuel tank and a canister, comprising:
- a fuel tank side connecting port which communicates with the fuel tank;
- a canister side connecting port which communicates with the canister;
- an intake manifold side connecting port which communicates with an intake manifold;
- a bellow type closing valve, which is composed of a bellow disposed between the intake manifold side connecting port and the canister side connecting port, and a valve seat disposed between the fuel tank side connecting port and the canister side connecting port;
- a check valve which is integrated with the bellow type closing valve, disposed inside the valve seat between the canister side connecting port and the fuel tank side connecting port, and is directed from the canister side connecting port to the fuel tank connecting port; and
- a solenoid valve which is disposed between the intake manifold side connecting port for permitting the intake manifold to communicate with the intake manifold connecting port during the operation of the engine while permitting the solenoid valve to be open to the atmosphere.

12. An evapo-control valve according to claim 3, wherein the check valve is a slit type check valve.

13. An evapo-control valve according to claim 6, wherein the closing valve is a diaphragm type closing valve.

14. An evapo-control valve according to claim 8, wherein the check valve is a slit type check valve.

15. An evapo-control valve according to claim 8, wherein the check valve is a shell type valve.

16. An evapo-control valve according to claim 11, wherein the check valve is a slit type check valve.

17. An evapo-control valve according to claim 11, wherein the check valve is a shell type valve.

* * * * *

UNITED STATES PATENT AND TRADEMARK OFFICE
CERTIFICATE OF CORRECTION

PATENT NO. : 5 181 497

DATED : January 26, 1993

INVENTOR(S) : Yoshiharu MATSUSHITA et al

It is certified that error appears in the above-identified patent and that said Letters Patent is hereby corrected as shown below:

Column 7, line 29; delete "diaphragm type".

Signed and Sealed this

Thirtieth Day of November, 1993

Attest:

BRUCE LEHMAN

Attesting Officer

Commissioner of Patents and Trademarks